(12) United States Patent
Khosrowshahi et al.

(10) Patent No.: US 12,481,862 B2
(45) Date of Patent: Nov. 25, 2025

(54) DEEP LEARNING FOR RAIN FADE PREDICTION IN SATELLITE COMMUNICATIONS

(71) Applicants: Aidin Ferdowsi Khosrowshahi, Germantown, MD (US); David Whitefield, Germantown, MD (US); Rob Torres, New Market, MD (US)

(72) Inventors: Aidin Ferdowsi Khosrowshahi, Germantown, MD (US); David Whitefield, Germantown, MD (US); Rob Torres, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1059 days.

(21) Appl. No.: 17/453,258

(22) Filed: Nov. 2, 2021

(65) Prior Publication Data
US 2023/0019771 A1    Jan. 19, 2023

Related U.S. Application Data

(60) Provisional application No. 63/203,351, filed on Jul. 19, 2021.

(51) Int. Cl.
*G06N 3/04* (2023.01)
*H04B 7/185* (2006.01)
(Continued)

(52) U.S. Cl.
CPC ........... *G06N 3/04* (2013.01); *H04B 7/18513* (2013.01); *H04L 41/147* (2013.01); *H04W 4/021* (2013.01)

(58) Field of Classification Search
CPC ...... G06N 3/04; G06N 3/0464; G06N 3/0475; G06N 3/0495; G06N 3/0499; G06N 3/08;
(Continued)

(56) References Cited

U.S. PATENT DOCUMENTS

| | | | | |
|---|---|---|---|---|
| 2020/0242733 | A1* | 7/2020 | Kumar et al. | G06N 3/084 382/276 |
| 2021/0058293 | A1* | 2/2021 | Whitefield et al. | H04W 40/22 709/223 |

OTHER PUBLICATIONS

Sonderby et al, MetNet: A Neural Weather Model for Precipitation Forecasting, Mar. 30, 2020 (Year: 2020).*
(Continued)

*Primary Examiner* — Alexey Shmatov
(74) *Attorney, Agent, or Firm* — Capitol City TechLaw; Jasbir Singh (57) ABSTRACT

A system and method for predicting rain fade. The method may include: training a Neural Network (NN) by importing into the NN a training set of image information and beacon information, wherein the image information includes image datasets including of a cloud view of an Area of Interest (AoI), a geolocation and a timestamp, and the beacon information includes beacon datasets including a beacon strength, a current rain fade state, a geolocation and a timestamp; pre-processing to homogenize and to extract spatially and temporally matching data for the AoI from a live image information and a live beacon information; and forecasting a rain fade based on the data in a near-future. The geolocation of the beacon datasets is located within the AoI, and the periodicity of the live beacon information and the live image information is less than or equal to five (5) minutes.

20 Claims, 5 Drawing Sheets

(51) Int. Cl.
   *H04L 41/147* (2022.01)
   *H04W 4/021* (2018.01)
(58) Field of Classification Search
   CPC . H04B 7/18513; H04L 41/147; H04L 41/149;
   H04L 41/0233; H04L 41/085; H04L
   41/06; H04L 61/00; H04L 69/00; H04W
   4/021; H04W 16/00
   See application file for complete search history.

(56) References Cited

OTHER PUBLICATIONS

Chen et al, A Machine Learning System for Precipitation Estimation Using Satellite and Ground Radar Network Observations, Feb. 2020 (Year: 2020).*
Dahman et al, Rain attenuation prediction model for satellite communications based on the MÃ©tÃ©o-France ensemble prediction system PEARP, Dec. 18, 2018 (Year: 2018).*
Higashiyama et al, Feature Extraction of NWP Data for Wind Power Forecasting Using 3D-Convolutional Neural Networks, Nov. 11, 2018 (Year: 2018).*
Liu, Daytime Rainy Cloud Detection and Convective Precipitation Delineation Based on a Deep Neural Network Method Using GOES-16 ABI Images, Oct. 30, 2019 (Year: 2019).*
Mishra et al, Deep Rainrate Estimation from Highly Attenuated Downlink Signals of Ground-Based Communications Satellite Terminals, May 4, 2020 (Year: 2020).*
Nielsen et al, CloudCast: A Satellite-Based Dataset and Baseline for Forecasting Clouds, Mar. 2, 2021 (Year: 2021).*
Roy et al, Attenuation prediction for fade mitigation using neural network with in situ learning algorithm, Jan. 5, 2011 (Year: 2011).*
"Nowcasting the Next Hour of Rain", Sep. 29, 2021, printed on Nov. 2, 2021 from https://deepmind.com/blog/article/nowcasting.
A. H. Nielsen, A. Iosifidis, and H. Karstoft, "Cloudcast: A satellite-based dataset and baseline for forecasting clouds," IEEE Journal of Selected Topics in Applied Earth Observations and Remote Sensing, vol. 14, pp. 3485-3494, 2021.
B. Roy, R. Acharya, and M. Sivaraman, "Attenuation prediction for fade mitigation using neural network with in situ learning algorithm," Advances in Space Research, vol. 49, No. 2, pp. 336-350, 2012.
B. Welford, "Note on a method for calculating corrected sums of squares and products," Technometrics, vol. 4, No. 3, pp. 419-420, 1962.
C. K. Sønderby, L. Espeholt, J. Heek, M. Dehghani, A. Oliver, T. Salimans, S. Agrawal, J. Hickey, and N. Kalchbrenner, "Metnet:A neural weather model for precipitation forecasting," arXiv preprint arXiv:2003.12140, 2020.
C.-S. Lu, Z.-W. Zhao, Z.-S. Wu, L.-K. Lin, P. Thiennviboon, X. Zhang, and Z.-F. Lv, "A new rain attenuation prediction model for the earthspace links," IEEE Transactions on Antennas and Propagation, vol. 66, No. 10, pp. 5432-5442, 2018.
D. Das and A. Maitra, "Time series prediction of rain attenuation from rain rate measurement using synthetic storm technique for a tropical location," AEU—International Journal of Electronics and Communications, vol. 68, No. 1, pp. 33-36, 2014.
E. Matricciani, "Global formulation of the synthetic storm technique to calculate rain attenuation only from rain rate probability distributions," in 2008 IEEE Antennas and Propagation Society International Symposium, 2008, pp. 1-4.
FCC, "Fixed satellite service by hughes network systems, llc," 2016. [Online]. Available: https://fcc.report/IBFS/SAT-LOA-20160624-00061.
FCC, "Fixed satellite service by hughes network systems, llc," 2017. [Online]. Available: https://fcc.report/IBFS/SAT-LOA-20170621-00092.
H. Dao, M. R. Islam, and K. A. S. Al-Khateeb, "Rain fade slope model in satellite path based on data measured in heavy rain zone," IEEE Antennas and Wireless Propagation Letters, vol. 12, pp. 50-53, 2013.
HughesNet, "Echostar xix," 2017. [Online]. Available: https://www.hughes.com/technologies/hughes-high-throughput-satellite-constellation/echostar-xix.
I. Dahman, P. Arbogast, N. Jeannin, and B. Benammar, "Rain attenuation prediction model for satellite communications based on the meteo-france ensemble prediction system pearp," Natural Hazards and Earth System Sciences, vol. 18, No. 12, pp. 3327-3341, 2018.
J. X. Yeo, Y. H. Lee, and J. T. Ong, "Rain attenuation prediction model for satellite communications in tropical regions," IEEE Transactions on Antennas and Propagation, vol. 62, No. 11, pp. 5775-5781, 2014.
L. A. R. d. S. Mello and M. S. Pontes, "Improved unified method for the prediction of rain attenuation in terrestrial and earth space links," in 2009 Sbmo/IEEE MTT-S International Microwave and Optoelectronics Conference (IMOC), 2009, pp. 569-573.
M. A. Samad, and D.-Y. Choi, "Learning-Assisted Rain Attenuation Prediction Model," Appl. Sci. Oct. 2020, 6017; doi:10.3390/app10176017.
M. A. Samad, F. D. Diba, and D.-Y. Choi, "A survey of rain fade models for earth-space telecommunication links—taxonomy, methods, and comparative study," Remote Sensing, vol. 13, No. 10, p. 1965, 2021.
M. N. Ahuna, T. J. Afullo, and A. A. Alonge, "Rain attenuation prediction using artificial neural network for dynamic rain jade mitigation," SAIEE Africa Research Journal, vol. 110, No. 1, pp. 11-18, 2019.
P. Series, "Propagation data and prediction methods required for the design of earth-space telecommunication systems," Recommendation ITU-R, pp. 618-12, 2015.
Q. W. Pan, J. E. Allnutt, and C. Tsui, "Evaluation of diversity and power control techniques for satellite communication systems in tropical and equatorial rain climates," IEEE Transactions on Antennas and Propagation, vol. 56, No. 10, pp. 3293-3301, 2008.
R. Prudden, S. Adams, D. Kangin, N. Robinson, S. Ravuri, S. Mohamed, and A. Arribas, "A review of radar-based nowcasting of precipitation and applicable machine learning techniques," arXiv preprint arXiv:2005.04988, 2020.
R. T. Union, "Prediction method of fade dynamics on earth-space paths," Recommendation ITU-R, 2005.
S. Gong, Y. Gao, H. Shi, and G. Zhao, "A practical mga-arima model for forecasting real-time dynamic rain-induced attenuation," Radio Science, vol. 48, No. 3, pp. 208-225, 2013.
S. N. Livieratos and P. G. Cottis, "Rain attenuation along terrestrial millimeter wave links: A new prediction method based on supervised machine learning," IEEE Access, vol. 7, pp. 138 745-138 756, 2019.
Chen Haonan et al: "A Machine Learning System for Precipitation Estimation Using Satellite and Ground Radar Network Observations", IEEE Transactions on Geoscience and Remote Sensing, IEEE, USA, vol. 58, No. 2, Feb. 1, 2020 (Feb. 1, 2020), pp. 982-994, XP011767306, ISSN: 0196-2892, DOI: 10.1109/TGRS.2019.2942280 [retrieved on Jan. 20, 2020].
International Search Report for PCT Application No. PCT/US2022/073767.
Mishra Kumar Vijay et al: "Deep Rainrate Estimation from Highly Attenuated Downlink Signals of Ground-Based Communications Satellite Terminals", ICASSP 2020—2020 IEEE International Conference on Acoustics, Speech and Signal Processing (ICASSP), IEEE, May 4, 2020 (May 4, 2020), pp. 9021-9025, XP033794385, DOI: 10.1109/1CA55P40776.2020.9054729 [retrieved on Apr. 1, 2020].

* cited by examiner

DEEP LEARNING FOR RAIN FADE PREDICTION IN SATELLITE COMMUNICATIONS

CROSS-REFERENCE TO RELATED APPLICATIONS AND INCORPORATION BY REFERENCE

The present application claims the benefit under 35 U.S.C. 119(e) of U.S. Provisional Application Ser. No. 63/203,351, filed Jul. 19, 2021, which is incorporated herein by reference in its entirety.

FIELD

A deep learning (DL)-based system and method to forecast future rain fade using raw data including images and link power measurements is disclosed. The images may include cloud movements imagery in various spectra from one or more viewpoints. The spectra includes radar, infrared, radio, ultra-violet and others. The viewpoints may include cloud top-view and cloud bottom-view imagery. For example, the cloud top-view images may be from a fixed or moving satellite, or a high altitude platform. The cloud bottom-view images may be radar images from the ground. Some of the images may include ground conditions, for example, radar images. A gateway diversity strategy utilizing rain fade forecasting improves weather-resiliency and enhances overall network availability. The predictions may predict rain fade for short-term (seconds) to long-term (several minutes up to around 65 minutes) sometimes referred to as "now-casting".

BACKGROUND

In the prior art, empirical, statistical, and fade slope models can predict rain fade to some extent. However, they typically require statistical measurements of rain characteristics in a given area and cannot be generalized to a large-scale system. Furthermore, such models typically predict near-future rain fade events but are incapable of forecasting far into the future, making proactive resource management more difficult.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In the present teachings, a Deep Learning (DL)-based system forecasts future rain fade using satellite and radar imagery data as well as link power measurements. The DL-based system outperforms current state-of-the-art machine learning-based algorithms in rain fade forecasting in the near and long term.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for predicting rain fade for a rain zone using a deep learning system including a computer processor. The method may include: training a Neural Network (NN) by importing into the NN a training set of image information and beacon information, wherein the image information includes image datasets including of a cloud view of an Area of Interest (AoI) and a timestamp, and the beacon information includes beacon datasets including a beacon strength, a current rain fade state, a geolocation and a timestamp; pre-processing to homogenize and to extract spatially and temporally matching data for the AoI from a live image information and a live beacon information; and forecasting a rain fade based on the data in a near-future. In the method, the geolocation of one or more of the beacon datasets is located within the AoI, a beacon periodicity of the live beacon information is greater than or equal to half (0.5) seconds, and an image periodicity of the live image information is less than or equal to five (5) minutes. Implementations may include one or more of the following features.

The method where the near-future is less than or equal to sixty-five (65) minutes.

The method where the image periodicity is different than the beacon periodicity, and the method includes using a previous copy of the live beacon information or the live image information.

The method where the image periodicity is different than the beacon periodicity, and the method includes extrapolating a previous copy of the live beacon information or the live image information as necessary for the matching.

The method where the beacon information is collected at a satellite transceiver and a geolocation of the satellite transceiver is located within the AoI.

The method where the cloud view includes a top-view from a satellite of the AoI or a bottom view from a radar of the AoI or a combination thereof.

The method where the live image information includes a radar image of the AoI and a ground truth for the AoI.

The method where the ground truth includes a current rain state and the pre-processing harmonizes the rain labels with current rain fade states of the beacon information.

The method where the live image information includes an image of the AoI from a high-altitude platform or satellite and the image includes images at various spectra.

The method where the pre-processing harmonizes the live image information to an image resolution.

The method where the pre-processing harmonizes a coordinate system of the live image information and the live beacon information.

The method where the training set balances a quantity of clear sky events as compared to a quantity of rain fade events.

The method where the NN processes the data using a 3D convolution neural network.

The method where the NN successively processes the data using a 3D convolution NN, a max pool, a flattening NN and a softmax NN.

The method where the AoI covers a ground area of at least 32 km×32 km.

The method where the AoI is centered over the geolocation of one or more of the beacon datasets.

The method where the AoI includes a plurality of AoI, the plurality of AoI are located within a rain zone and the evaluating predicts the rain fade for the plurality of AoI.

The method may include proactively managing gateway diversity based on the forecasting.

A method for predicting rain fade for a rain zone using a deep learning system may include: training a Neural Network (NN) by importing into the NN a training set of image information and beacon information, wherein the image information includes image datasets including of a cloud view of an Area of Interest (AoI), a geolocation and a timestamp, and the beacon information includes beacon datasets including a beacon strength, a current rain fade state, a geolocation and a timestamp; pre-processing to homogenize and to extract spatially and temporally matching data for the AoI from a live image information and a live beacon information; and forecasting a rain fade based on the data in a near-future. In the method, the geolocation of one or more of the beacon datasets is located within the AoI, the near-future is less than or equal to sixty-five (65) minutes, the beacon information is collected at a satellite transceiver and a geolocation of the satellite transceiver is located within the AoI, the live image information includes an image of the AoI from a satellite, a radar image of the AoI and a ground truth for the AoI, and the NN processes the data using a 3D convolution neural network.

The method where implementations of the described techniques may include hardware, a method or process, or computer software on a computer-accessible medium. Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings forecast precipitation using spatial (radar and/or satellite images) and temporal (power beacon measurements at various frequencies) to predict chances of rain fade. The DL-based system outperforms current state-of-the-art machine learning-based algorithms in rain fade forecasting in the near and long term. Cloud bottom-view image data (for example, radar data with weather condition information) may be more effective for short-term prediction. Cloud top-view image data may be more effective for long-term predictions. In some embodiment, a combination of cloud top-view and bottom-view image data may be used to make more effective long-term and short-term predictions. Rain fade refers to the radio signal fade issues caused by rain. The effects of rain fade are more widely seen in higher frequency bands, such as Ka-band, Q-band, V-band and the radio spectrum used by satellite and cellular communication systems.

For ground Radio Frequency (RF) gateway locations (primary gateway) subject to high rain fade, a satellite gateway can connect to a second antenna providing RF terminal (RFT) diversity. The RFT may be served by the primary gateway or by a different gateway, namely, a diversity gateway. The system may automatically select and switch between the antennae based on their respective rain fade. When a system can predict/anticipate an occurrence of a rain fade, then it can proactively switch between the primary and diversity antennae/gateway to maintain the quality of service. Hence, rain fade forecasting enhances RFT gateway diversity switchover and switch back.

The link statuses for the links of a RF communication system and the spatial-temporal data from several RF gateways may be used to classify weather into fade or non-fade classes. In some embodiments, a 3-D convolutional neural network (CNN) may receive input data. The input data may include cloud top-view images (for example, from the Geostationary Operational Environmental Satellite 16 (GOES-16)), cloud bottom-view images, and link power data. The DL system extracts necessary features from the input data to forecast rain fade. The present teachings include preprocessing the input data to prepare the data to train the DL system and to predict the rain fade.

Continuous weather imagery and monitoring of meteorological and space environment data is available, for example, GOES-16 for across North America. The data includes advanced imaging with high spatial resolution, for example, 16 spectral channels with a 5-minute scan frequency for accurate forecasts and timely warnings. A live or real-time feed and full historical archive of Advanced Baseline Imager (ABI) radiance data (Level 1b) is available. In addition, a 1 km×1 km resolution mosaic of National Weather Service (NWS) radar reflectivity activity as images, with a 5-minute scan frequency, is available. The DL architecture processes satellite images, radar images and the information about rain fade at gateways such as received power from the satellite at beacons installed at gateways and forecasts rain fade events in the future.

The present teachings may be used in satellite communications, cellular communications, and other line-of-sight communication systems, for example, to proactively switch before a rain fade event between diverse satellite gateways, cellular base stations and the like. Beacon data may be collected at a geolocation of a transceiver, for example, a satellite gateway, a cellular base station, or the like. A beacon may a specific signal from a transmitter to a receiver, for example, a satellite to a ground system. In some embodiments, a beacon is any transmission signal that is subject to atmospheric weather effects. The present description uses satellite communications for illustration.

Satellite Communications

A satellite communication includes four different links: 1) Gateway to satellite link, 2) Satellite to remote link, 3) Remote to satellite link, and 4) Satellite to gateway link. For each of these links, different implementations may be used to mitigate the rain fade. For the gateway to satellite link, a satellite transponder includes automatic level control to mitigate rain fades to some level. In case of heavy rain fade, automatic uplink power control is activated to maintain the predefined received power at the satellite. To mitigate the rain fade effect on satellite to remote and remote to satellite links, Adaptive Coding and Modulation (ACM) and adaptive inroute selection may be used. The satellite to gateway link is generally mitigated by the large size and gain of a gateway antenna.

Preprocessing of Training Data

Figure 1:
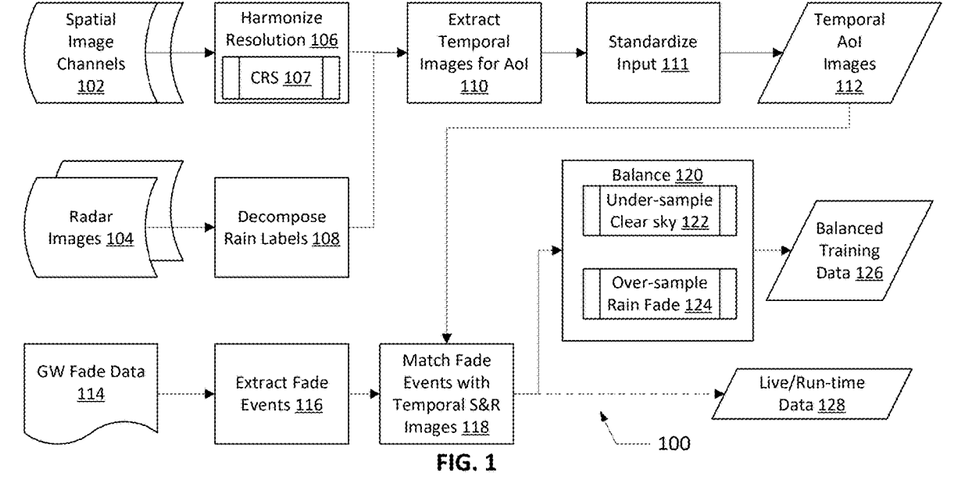
FIG. 1 an exemplary process to preprocess raw data to obtain balanced training data and run-time data according to various embodiments.

FIG. 1 an exemplary process to preprocess raw data to obtain balanced training data and run-time data according to various embodiments.

An exemplary process 100 may be used to preprocess raw data to obtain balanced training data. The process 100 may preprocess spatial image channels 102, radar images 104 and GW fade data 114 to obtain balanced training data 126. The process 100 may include an operation 106 to harmonize resolutions among the spatial image channels 102, an operation 107 to harmonize the CRS across images, an operation 108 to decompose rain labels of the radar images 104, an operation 110 to extract temporal images for areas of interest, an operation 112 to homogenize input including image, an operation 116 to extract fade events from the GW fade data 114, an operation 118 to match the extracted fade events of operation 116 with the temporal AoI Spatial and Radar images 112, and an operation 120 to balance the quantity of clear sky and rain fade events included in the balanced training data 126. Operation 120 may under-sample clear sky events at sub-operation 122 and over-sample rain fade events at sub-operation 124.

Harmonize Resolution: In some embodiments, the resolution for images from different resources may be harmonized to an identical resolution per operation 106. For example, GOES-16 includes images of 16 spectral channels (0.47 µm-13.3 µm) with a 5-minute sampling rate. However, there are some problems with this raw data that need to be addressed. As, the channels have different spatial resolutions varying from 0.000014 to 0.000056 radians in the Geostationary coordinate system reference (CSR). Therefore, either the channels with a higher resolution may be down sampled to match the minimum resolution of the channels or the lower resolution channels may be up sampled to match with the maximum resolution. Up sampling may result in increasing the sizes of the files (and consequently the processing requirements). If the lower resolution images (0.000056 radians) are used, every pixel of the image will cover approximately a 2 Km×2 Km area on the US map.

Harmonize CRS: In some embodiments, the coordinate systems for images from different resources may be harmonized per operation 107. For example, the Geostationary CRS of GOES-16 may be transformed to a Geodetic CRS, a more commonly used CRS. Geodetic CRS describes the location of each gateway in latitude and longitude. This transformation may not be needed for the radar data.

Extract Areas of Interest: The locations of gateways are Areas of Interest (AoI). In some embodiments, data for square areas centered on AoI may be extracted from the original raw spatial and radar images per operation 110. The resolution of the extracted images depends on the size of a particular AoI. For example, a 32 pixels×32 pixels image may cover an area of approximately 64 Km×64 Km. Operation 110 stores the temporal AoI Images 112. In the example of GOES-16 data and radar data the temporal AoI images 110 may include 16 plus 3 channels for each AoI (location of RF gateway or RFT).

Decomposing Weather Condition Channels: Data from different sources may code precipitation differently. The values of each pixel in the raw data may be decomposed and homogenized, for example, fade labels used by external data may be mapped to fade labels used in the GW fade data 114. For example, some radar data uses values from 0 to 48, where 0 to 16 indicates an intensity of rain, 17 to 32 indicates an intensity of a mixture of snow and rain, and 33 to 48 indicates an intensity of snow. As such, each radar image may be decomposed into channels corresponding to rain, snow, and mix.

Homogenize input: In some embodiments, a mean value of each channel may be subtracted from the pixels of each channel and then divided by the standard deviation of the channel. As such, the mean and the standard deviation of the input channels equal to zero and one respectively. Formally, if $p_{ij}^c$ to be a pixel of an image from channel c located at the i-th row and the j-th column, then the homogenized pixel will be $$\overline{p}_{ij}^c = \frac{p_{ij}^c - m^c}{s^c},$$

where $m^c$ and $s^c$ are the sample mean and the sample standard deviation values of channel c. In some embodiments, access to all the images may be needed to derive $m^c$ and $s^c$. In some embodiments, a running approach, for example, Welford's online algorithm, rather than accessing all the images may be used to calculate and update the mean and standard deviation values.

Ground Truth Extraction: For ground truth, beacon measurements at gateways and included in the GW fade data 114 may be compared to a rain fade threshold. The system may extract rain fade events per operation 116 and match their time and AoI samples per operation 118 with the temporal AoI images 112. During training, a beacon data sample with a sampling duration, for example, 1-minute sampling may be used. For each time sample a minimum beacon value within the past five minutes, a label for the past five minutes, and a label for the future five minutes may be derived. For past or future labels, a fixed label (for example, 1) may be used to indicate when the minimum beacon value of past or future 5 minutes is less than the rain fade threshold. For instance, three consecutive sampling time instances, namely t1, t2, and t3, then the minimum beacon value between t1 and t2 may be used to define the past label at time instance t2 and the minimum beacon value between t2 and t3 may be used to define the future label at this time instance. The resulting sample and ground truth from the past 5 minute the "current beacon value" and "current rainfade status" and the resulting label for the future 5 minutes the "target label". The current beacon value and current rain fade status may be used along with the spatial and radar data to improve the system's accuracy. The sampling rate of spatial and radar data (for example, 5 minutes) may be less often the sampling rate of beacon data (for example, 1 minute). A most recent spatial or radar image is used by the model in between two sampling time steps. The sampling rate of image data for training may be different than the sampling rate of image data in practice.

Balance data: The current rain fade states are extremely imbalanced as less than 1% of the samples may be labeled as rain fade due to the weather condition at these locations. As such, using all of the samples will introduce a bias to the model and will increase the number of false negatives (FN) predictions. A under-sample of the clear weather (no rain fade) samples and oversample of the rain fade samples may be used to balance the number of samples for true (rain fade) and false (clear) cases. To under sample, some of the clear sky instances may be periodically dropped for the training. To oversample, multiple copies of the rain fade instances may be used for the training. Oversampling the rain fade images and under-sampling the clear sky images balances the ratio between the number of true and false samples.

In some embodiments, the balanced training data 126 may include spatial images (for example, GOES-16 images), radar images, beacon power levels at AoIs around GWs, and rain fade states for each clear sky and rain event used for training.

When processing live raw data, after the matching operation 118, the live/real-time data 128 may be evaluated to forecast rain fade events with a trained NN. As such, the process 100 may preprocess live spatial image channels 102, live radar images 104 and live GW fade data 114, with the exception of the balancing operation 120, to forecast rain fade events in near real-time (within a few seconds). The forecasts may be used by to manage gateway diversity, for example, as illustrated by a rain fade forecast method 300 of FIG. 3.

Deep Learning Architecture

Figure 2:
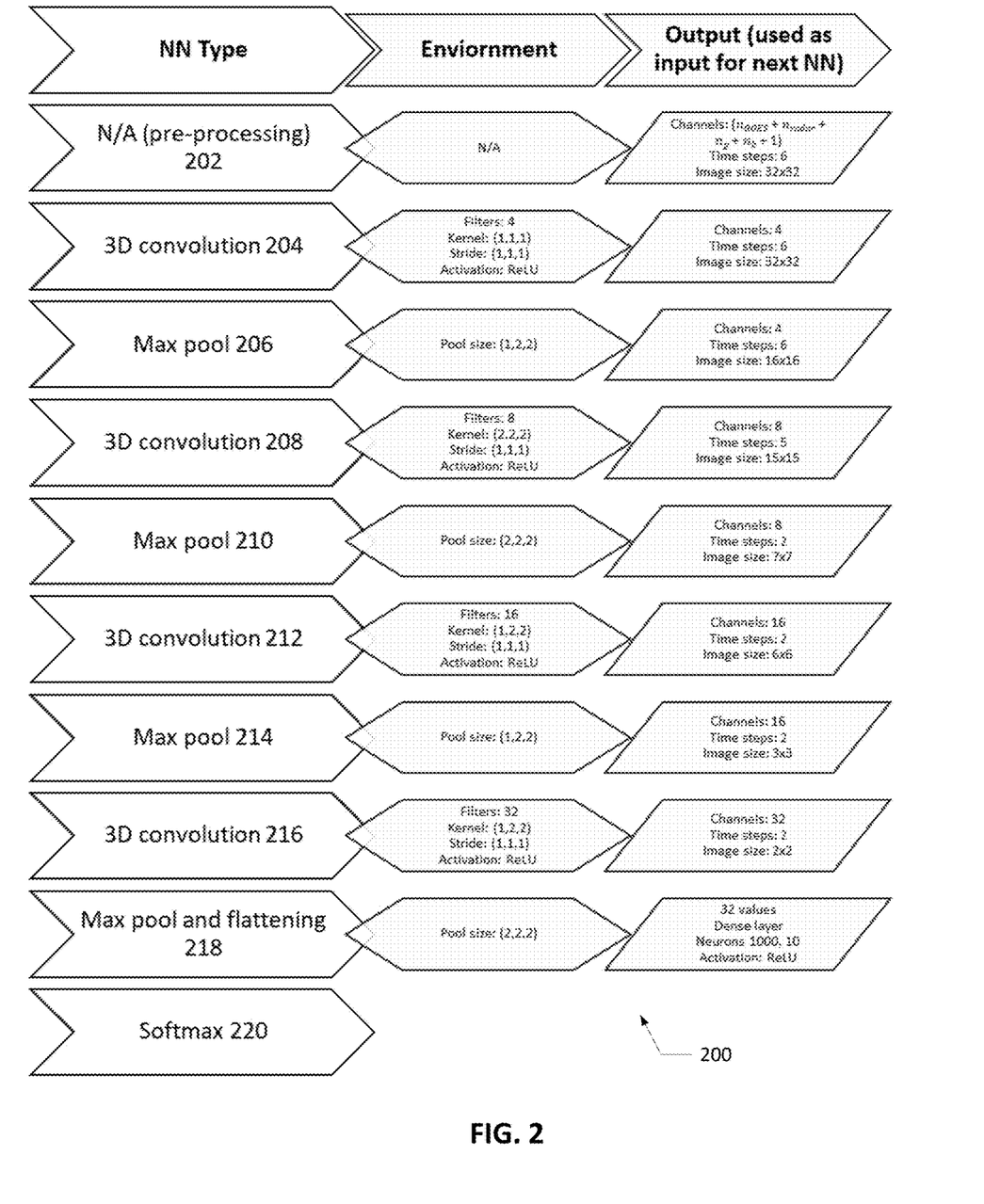
FIG. 2 illustrates a deep learning system to forecast rain fade according to various embodiments.

FIG. 2 illustrates a deep learning system to forecast rain fade according to various embodiments.

A deep learning system 200 to forecast rain casts may include a hierarchy of neural network computation layers. In FIG. 2 column 1 identifies a NN type, column 2 lists exemplary parameters/environment for the NN, and column 3 lists the NN output and a format of the NN output. The system 200 includes the NNs identified in column 1. The system 200 may invoke the identified NNs in the sequence detailed in FIG. 2. The system 200 includes a pre-processor to harmonize and homogenize raw data from various resources and produce the balanced data as described above.

As shown in FIG. 2, the system 200 may use multiple layers (204, 208, 212, 216) of a 3D CNN to capture the spatio-temporal interdependencies of the spatial and radar images. In some embodiments, a Long-Short Term Memory (LSTM)-2D CNN may be used in the DL system 200. While a 2D CNN may extract spatial features from an input image, a 3D CNN (or an LSTM-CNN) block can learn the temporal relationship between the input images. In some embodiments a 2D CNN may be used instead of a 3D CNN in the multiple layers (204, 208, 212, 216). For example, a first layer 204 may extract the interdependencies between the channels and the second layer 208 or later layers 212, 216 may find the rainy weather forecasting features of the images. After every CNN layer, a pooling layer (206, 210, 214, 218) may be used to reduce the size of the input. The CNN may use non-linear rectifier (RELU) activation as specified in the second column of FIG. 2.

One of the pooling layers of the CNN may include a flattening functionality to flatten a 3D (or 2D) input into a 1D output, for example, after last CNN layer 216. In FIG. 2, pooling layer 218 may include the flattening functionality. One of the multiple layers of the CNN may include a dense layer for learning the relationship between the input images and the probability of the rain fades, for example, after last CNN layer 216. In FIG. 2, pooling layer 218 may be include a dense layer. An activation function of the last layer, for example, layer 218, may map the output of the dense layer to a probability value between 0 and 1. The final layer's activation function may be chosen to be a softmax layer 220.

Preparation of the Input Data for the DL Model

Although spatial and radar images are the main sources of input for training the DL model, ground information may be attached to them. The ground information may include GW locations, a current rain fade state of each GW for each input sample interval, and one or more current beacon measurements at each GW.

In some embodiments, the ground information may be integrated by adding a gateway channel and a beacon channel to the image data. The gateway channel may include the ground information for all the AoI or gateways of a rain zone. The beacon channel may include the ground information for all the beacons in the AoI or gateways of a rain zone. Coverage areas may be separated into rain zones per their expected rain patterns. The gateway channel or the beacon channel may use a matrix to convey the ground information. Thus, in this embodiment, letting $n_p$ be the number of samples from past, then input sample to the CNN may have a $n_p \times 32 \times 32 \times (n_{GOES}+n_{radar}+1+1+1)$ shape.

In some embodiments, the ground information may be integrated by adding extra channels to the image data. For the GW locations, a one-hot encoding for each GW (meaning that for $n_g$ number of GWs $n_g$ extra channels are added). All the pixels of the $n_g$ GW channels may have a zero value except one for one channel when spatial and/or radar images are for the i-th GW. This input allows multiple gateways to share the same prediction model. $n_g$ extra channels may be added to indicate when the i-th GW is in rain fade, for example, by setting all pixels in the rain fade channels to +1 s if the current state of the GW is rain fade −1 s otherwise. These rain fade channels provide the ground truth about the rainfade of the gateway in the recent past for the given gateway at the given time. In some embodiments, historical beacon data for each gateway may bucketize the beacon measurements into $n_b$ buckets such that each bucket has approximately equal number of samples. For each bucket two values that define the two ends of the bucket may be used. Then the $n_b$ extra channels may be considered when the current beacon value falls into the i-th bucket the i-th channel may be defined as 1 s and the other channels as −1 (one hot encoding).

Thus, considering $n_{GOES}$ and $n_{radar}$ to be the number of channels from GOES-16 and radar sources, in some embodiments the system may at every time step have $n_{GOES}+n_{radar}+n_g+n_b+1$ channels. In some embodiments, only GOES-16 or radar data is fed to the model, the number channels are chosen to be $n_{GOES}+n_g+n_b+1$ or $n_{radar}+n_g+n_b+1$. Next, the input data for each time step will have a 32×32×($n_{GOES}$+

$n_{radar}+n_g+n_b+1$) size where 32 is the number of pixels in each direction of the GOES-16 and radar images. In addition, the images of the multiple steps in the past may be fed to the 3D CNN to capture the temporal behavior of the input images. Thus, in this embodiments, letting $n_p$ be the number of samples from past, then input sample to the CNN may have a $n_p \times 32 \times 32 \times (n_{GOES}+n_{radar}+n_g+n_b+1)$ shape.

To train the model the data may be split into a training set and a test set. The training set may include the first 80% of the preprocessed data, while the remaining 20% may be kept for testing the model. The under-sampling and over-sampling steps of the preprocessing (operation 120) are done only on the training set. The trained version of the system 200 may be used to evaluate future unseen samples, for example, in near real-time, by rain zones.

Rain Fade Forecast

Figure 3:
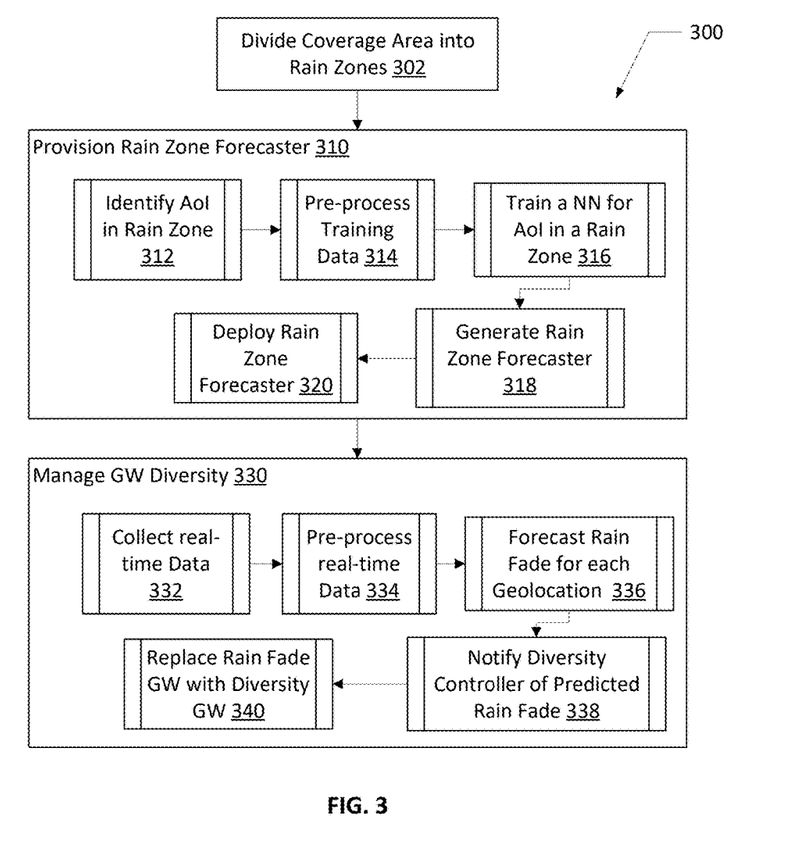
FIG. 3 illustrates a rain fade forecast method according to various embodiments.

FIG. 3 illustrates a rain fade forecast method according to various embodiments.

A rain fade forecast method 300 may include an operation 302 to divide a coverage area into rain zones per there expected rain patterns. For example, United States rainfall climatology may generally be described as having the following rain zones. The eastern part of the contiguous United States east of the 98th meridian, the mountains of the Pacific Northwest, the Willamette Valley, and the Sierra Nevada range are the wetter portions of the nation, with average rainfall exceeding 30 inches (760 mm) per year. The drier areas are the Desert Southwest, Great Basin, valleys of northeast Arizona, eastern Utah, and central Wyoming. Increased warming within urban heat islands leads to an increase in rainfall downwind of cities. The rain zones of the present teachings maybe defined along climatology rainfall zones, may merge climatology rainfall zones, or may subdivide climatology rainfall zones. The defining of the rainfall zones may be done of logistical reasons by a network operator.

The rain fade forecast method 300 may include operation 310 to provision a rain zone forecaster. The provisioning 310 may include an operation 312 to identify AoI in the rain zone. The provisioning 310 may include an operation 314 to pre-process training data for the rain zone. Exemplary pre-processing of operation 314 may be performed per FIG. 1. The provisioning 310 may include an operation 316 to train a NN for the AoI in a rain zone. The NN may be a system of FIG. 2. The provisioning 310 may include an operation 318 to generate a rain zone forecaster. The rain zone forecaster includes the NN after training. In the rain zone forecaster, further learning by the NN when evaluating live/real-time/non-training/test raw data may be disabled. The provisioning 310 may include an operation 320 to deploy a rain zone forecaster for each rain zone in a coverage area. The one or more rain zone forecasters may be deployed in a Network Operations Center.

The rain fade forecast method 300 may include operation 330 to manage GW diversity. The managing operation 330 may include operation 332 to collect evaluation raw data, for example, satellite images, radar images, gateway and beacon measurements. The managing operation 330 may include operation 334 to pre-process the evaluation raw data. The pre-processing may skip a balance training data operation, for example, operation 120 of FIG. 1. The managing operation 330 may include operation 336 to forecast rain fade for all or some of the geolocations of beacons included in the evaluation data. When DL systems are deployed per rain zone, evaluation data may be used for forecasting by one or more DL systems. In some embodiments, particularized data streams/channels may be established for each rain zone. The managing operation 330 may include operation 338 to notify a diversity controller of predicted rain fade. The notifications may be classified by imminency of expected rain fade, for example, within 1 minute, within 5 minutes, within 30 minutes, within an hour or the like. The managing operation 330 may include operation 340 to replace, prior to rain fade occurring, a primary GW with an available diversity GW not subject to rain fade. In some embodiments, the notifications may be used to schedule diversity GW usage, notify an Network Operations Center, notify subscribers and the like.

Experimental Results—Evaluation Metrics

Four exemplary terminologies may be used to evaluate the performance of the model:
True-positive (TP): A rain fade event correctly classified as rain fade.
False-positive (FP): A clear sky event incorrectly classified as rain fade.
True-negative (TN): A clear sky event correctly classified as clear sky.
False-negative (FN): A rain fade event incorrectly classified as clear sky.

Exemplary evaluation metrics may be used. Closeness of predictions to their actual labels may be defined as $$\text{accuracy} = \frac{(TP+TN)}{(TP+TN+FN+FP)}.$$

Fraction of TP instances among the positive instances predicted by the model may be defined as $$\text{precision} = \frac{TP}{(TP+FP)}.$$

Fraction of TP instances among the actual (ground truth) positive instances and may be defined as:

$$\text{recall} = \frac{TP}{(TP+FN)}.$$

A harmonic mean of precision and recall which allows us to combine these two metrics that may be defined as $$F1 = \frac{TP}{(TP+FP)}.$$

The F1-score evaluates the model during the training phase to find a model that has both good precision and recall rates.

Experimental Results—Dataset

Figure 4:
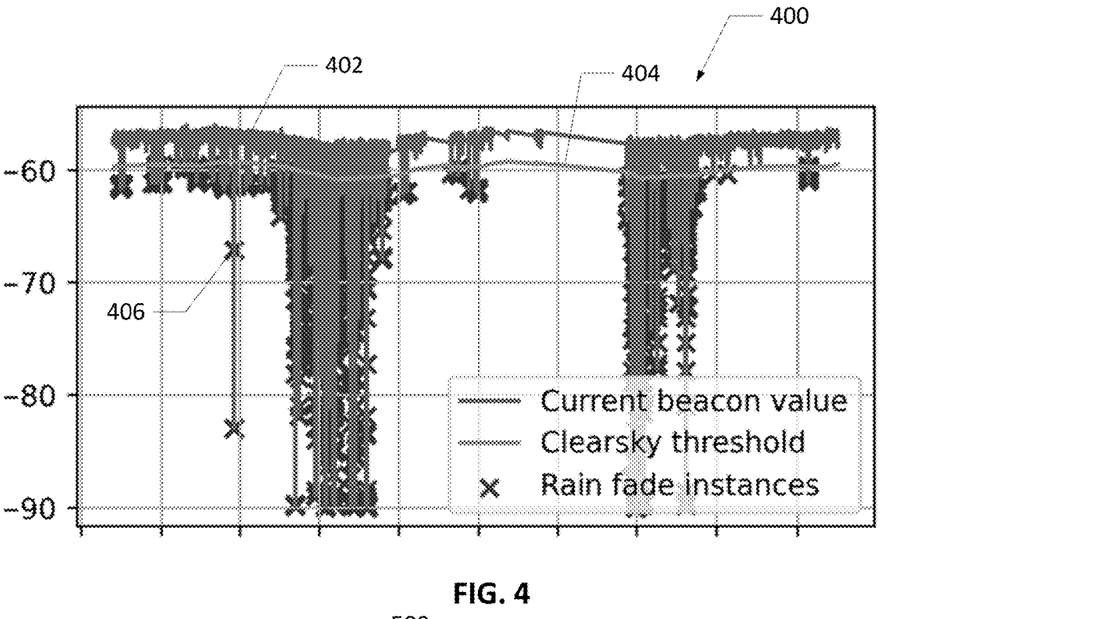
FIG. 4 illustrates exemplary beacon measurements for a sample gateway according to various embodiments.

To evaluate the model, the data is labeled by aggregating beacon measurements of each gateway and using a weighted averaging to derive the clear sky threshold for each time step (for example, clear sky threshold 404). The beacon measurements of each day are compared to this threshold.

FIG. 4 illustrates exemplary beacon measurements for a sample gateway according to various embodiments.

A beacon measurement chart 400 illustrates a current beacon value 402 (in decibels) and rain fade instances 406 recorded by a GW over time. A clear sky threshold 404 for adequate link performance is also illustrated. In some embodiments, the clear sky threshold 404 may vary. The illustrated beacon measurements, clear sky threshold, and rain fade cases are for a single gateway.

Experimental Results—Experiments

A DL system was provided input imagery (radar and satellite) from past 30 minutes. The DL system correctly predicted rain fade in 60 minutes in the future. The DL system may predict a long-term rain fade event, for example, as far as 60 minutes in the future. A DL system may be trained for different target future time predictions, for example, from 5 minutes to 65 minutes into the future. The DL system was trained on three imagery input scenarios: a) satellite (GOES-16) only, b) radar only, and c) satellite and radar together. Input to all three input scenarios also included beacon data information.

FIG. 5A, FIG. 5B, FIG. 5C and FIG. 5D illustrate accuracy, recall, precision and F1 recall, respectively, comparing accuracy of three imagery input scenarios and some prior art models on test data of one RF gateway according to various embodiments.

Figure 5A:
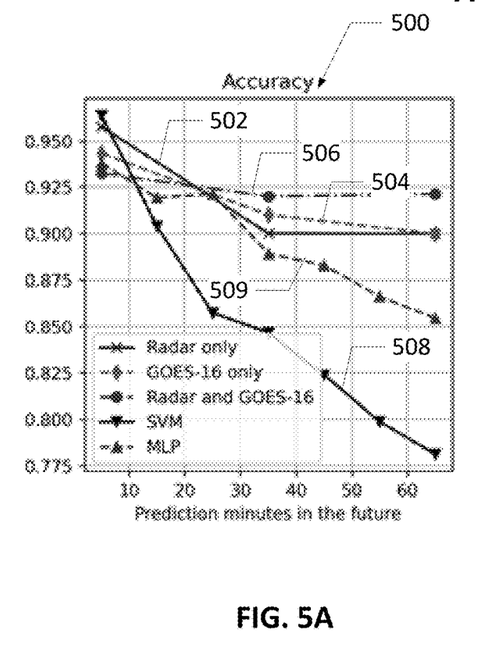
FIG. 5A, FIG. 5B, FIG. 5C and FIG. 5D illustrate accuracy, recall, precision and F1 recall, respectively, comparing accuracy of the three imagery input scenarios and some prior art models on test data of one RF gateway according to various embodiments.

FIG. 5A illustrates an accuracy plot 500 plotting prediction accuracy made using (a) radar and beacon information 502, (b) GOES-16 and beacon information 504, (c) radar GOES-16 and beacon information 506, (d) SVM model (prior art) 508 and (e) MLP model (prior art) 509.

Figure 5B:
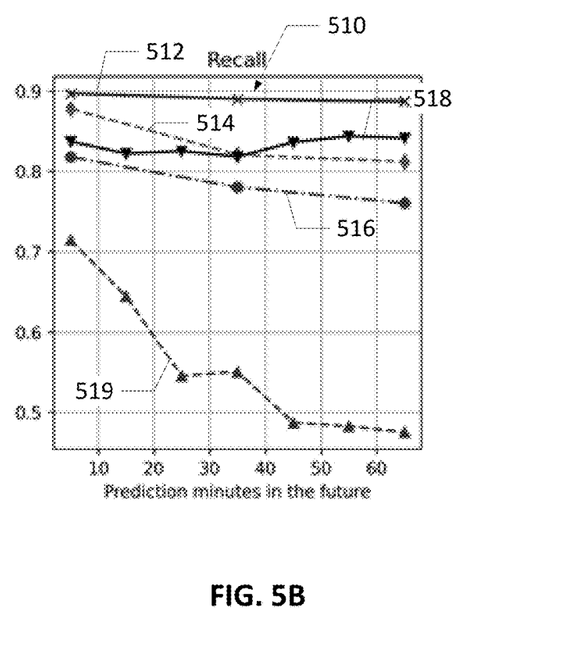

FIG. 5B illustrates a recall plot 510 plotting prediction recall made using (a) radar and beacon information 512, (b) GOES-16 and beacon information 514, (c) radar GOES-16 and beacon information 516, (d) SVM model (prior art) 518 and (e) MLP model (prior art) 519.

Figure 5C:
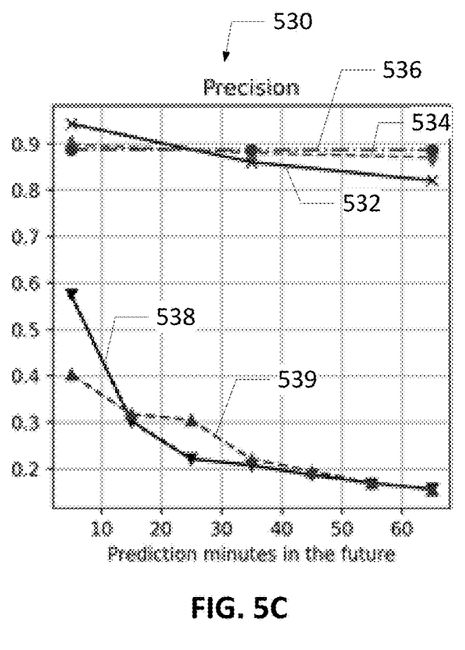

FIG. 5C illustrates a precision plot 530 plotting prediction precision made using (a) radar and beacon information 532, (b) GOES-16 and beacon information 534, (c) radar GOES-16 and beacon information 536, (d) SVM model (prior art) 538 and (e) MLP model (prior art) 539.

Figure 5D:
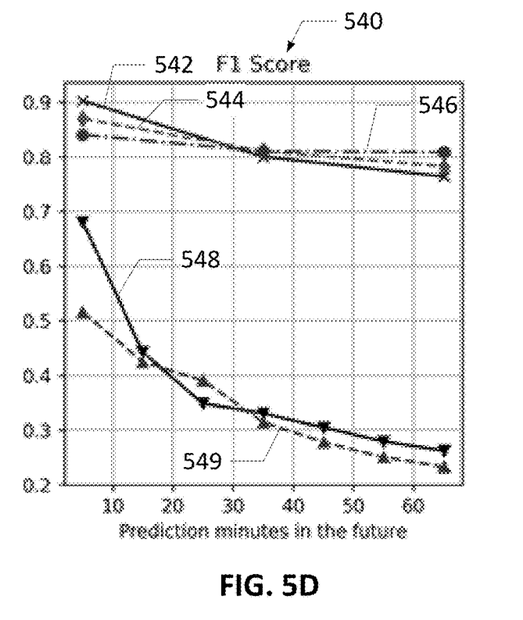

FIG. 5D illustrates a F1-score plot 540 plotting prediction precision made using (a) radar and beacon information 542, (b) GOES-16 and beacon information 544, (c) radar GOES-16 and beacon information 546, (d) SVM model (prior art) 548 and (e) MLP model (prior art) 549. Per FIG. 5D, the F1-score of the present teachings outperforms the F1-scores of the prior art teachings. In particular, a DL system trained with radar and beacon information 542 only outperforms the other scenarios for short term forecasting in terms of f1-score. The DL system trained only on GOES-16 and beacon information 544 outperforms the other scenarios in long term forecasting. Without limitation, this may be because the GOES-16 images track the movements of the clouds while the radar images have the weather condition records. Thus, for a short-term prediction radar data is more effective while for a long-term prediction the GOES-16 data is more effective.

The performance of the present teachings outperform the other state-of-the art ML models especially for long term predictions. The prior art systems are ML-based rain fade prediction models that only use time series data. The beacon information was used as the time series input for the MLP model 549 (Multi-Layer Perceptron) and the SVM model 548 (Support Vector Machine).

Figure 6:
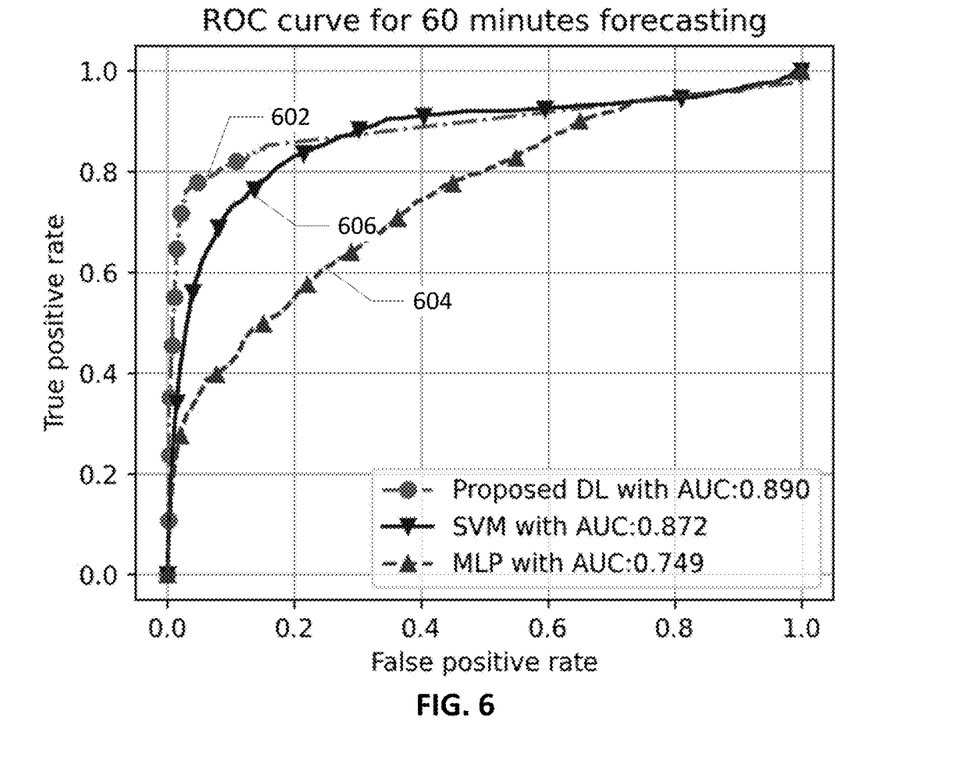
FIG. 6 illustrates Receiver Operating Characteristic (ROC) curve of a long-term prediction scenario of the present teachings versus two ML-based models according to various embodiments.

FIG. 6 illustrates Receiver Operating Characteristic (ROC) curve of a long-term prediction scenario of the present teachings versus two ML-based models according to various embodiments.

A ROC curve depicts a trade-off between the TP rate (TPR) and the FP rate (FPR) by plotting TPR versus FPR at various thresholds. Lowering the classification threshold causes more observations to be classified as positive, increasing the TP rate. A ROC curve 602 of the DL system is closer to the top left of the graph and achieves a high TPR while maintaining a low FPR. The ROC curve 604 for a MLP classifier (in particular) and the ROC curve 606 for a SVM classifier illustrates that the two prior art classifiers cannot well distinguish between the two classes. A ROC curve that is closer to the diagonal, such as ROC curves 604 and 606, imply lower TPR and higher FPR. An Area Under the ROC Curve (AUC) measures performance across all possible classification thresholds. The ROC curve 602 of the present teachings has a higher AUC than the prior art ROC curves 604, 606. The AUC of the ROC curve 602 implies that the DL system of the present teachings better predicts the probability of rain fade than the probability of clear sky.

Figure 7:
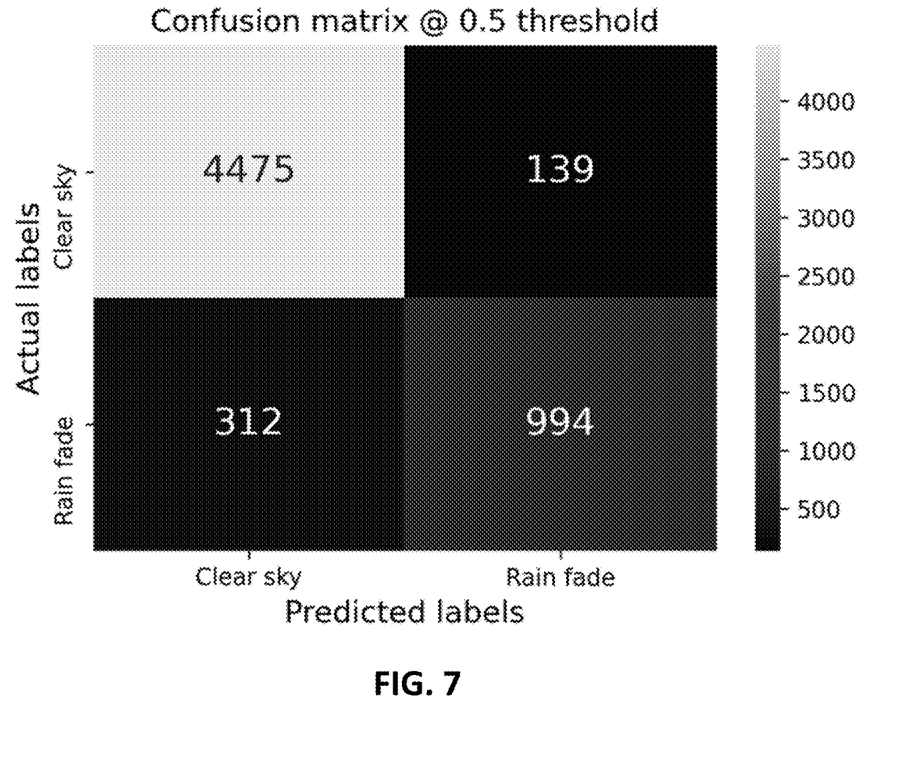
FIG. 7 illustrates a confusion matrix of the present teachings when predicting rain fade 60 minutes in the future in various embodiments.

FIG. 7 illustrates a confusion matrix of the present teachings when predicting rain fade 60 minutes in the future in various embodiments.

According to FIG. 7, with a classification threshold of 0.5, the present teachings accurately predict rain fade and clear sky events almost 12 times more than the false labels ((TP+TN) (FN+FP)≈12). This illustrates the effectiveness of the present teachings in terms of forecasting the rain fade.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for predicting rain fade for a rain zone using a deep learning system comprising a computer processor, the method comprising:
    training a Neural Network (NN) by importing into the NN a training set of image information and beacon information, wherein the image information comprises image datasets comprising of a cloud view of an Area of Interest (AoI), a geolocation and a timestamp, and the beacon information comprises beacon datasets comprising a beacon strength, a current rain fade state, a geolocation and a timestamp;
    receiving, at a receiver, a live beacon;
    pre-processing to homogenize and to extract spatially and temporally matching data for the AoI from a live image information and a live beacon information comprising power measurements of the live beacon at the receiver; and
    forecasting a rain fade based on the data in a near-future, wherein the geolocation of one or more of the beacon datasets is located within the AoI,
    a beacon periodicity of the live beacon information is less than or equal to five (5) minutes,
    the pre-processing flattens a portion of the live image information from 3-dimensional or 2-dimensional information to 1-dimensional information, and an image periodicity of the live image information is less than or equal to five (5) minutes.

2. The method of claim 1, wherein the near-future is less than or equal to sixty-five (65) minutes.

3. The method of claim 1, wherein the image periodicity is different than the beacon periodicity, and the method further comprises using a previous copy of the live beacon information or the live image information.

4. The method of claim 1, wherein the image periodicity is different than the beacon periodicity, and the method further comprises skipping a previous copy of the live beacon information or the live image information as necessary for the matching.

5. The method of claim 1, wherein the beacon information is collected at a satellite transceiver and a geolocation of the satellite transceiver is located within the AoI.

6. The method of claim 1, wherein the cloud view comprises a top-view from a satellite of the AoI or a bottom view from a radar of the AoI or a combination thereof.

7. The method of claim 1, wherein the live image information comprises a radar image of the AoI and a ground truth for the AoI.

8. The method of claim 7, wherein the ground truth comprises a rain label and the pre-processing harmonizes the rain labels with current rain fade states of the beacon information.

9. The method of claim 1, wherein the live image information comprises an image of the AoI from a high-altitude platform or satellite and the image comprises images at various spectra.

10. The method of claim 1, wherein the pre-processing harmonizes the live image information to an image resolution.

11. The method of claim 1, wherein the pre-processing harmonizes a coordinate system of the live image information and the live beacon information.

12. The method of claim 1, wherein the training set balances a quantity of clear sky events as compared to a quantity of rain fade events.

13. The method of claim 1, wherein the NN processes the data using a 3D convolution neural network.

14. The method of claim 1, wherein the NN successively processes the data using a 3D convolution NN, a max pool, a flattening NN and a softmax NN.

15. The method of claim 1, wherein the AoI covers a ground area of at least 32 km×32 km.

16. The method of claim 1, wherein the AoI is centered over the geolocation of one or more of the beacon datasets.

17. The method of claim 1, wherein the AoI comprises a plurality of AoI, the plurality of AoI are located within in a rain zone and the evaluating predicts the rain fade for the plurality of AoI.

18. The method of claim 1, further comprising proactively managing gateway diversity based on the forecasting.

19. A method for predicting rain fade for a rain zone using a deep learning system comprising a computer processor, the method comprising:
training a Neural Network (NN) by importing into the NN a training set of image information and beacon information, wherein the image information comprises image datasets comprising of a cloud view of an Area of Interest (AoI), a geolocation and a timestamp, and the beacon information comprises beacon datasets comprising a beacon strength, a current rain fade state, a geolocation and a timestamp;
receiving, at a receiver, a live beacon;
pre-processing to homogenize and to extract spatially and temporally matching data for the AoI from a live image information and a live beacon information comprising power measurements of the live beacon at the receiver; and
pre-processing to homogenize and to extract spatially and temporally matching data for the AoI from a live image information and the live beacon information; and
forecasting a rain fade based on the data in a near-future,
wherein the geolocation of one or more of the beacon datasets is located within the AoI,
the near-future is less than or equal to sixty-five (65) minutes,
the beacon information is collected at a satellite transceiver and a geolocation of the satellite transceiver is located within the AoI,
the live image information comprises an image of the AoI from a satellite, a radar image of the AoI and a ground truth for the AoI,
the pre-processing flattens a portion of the live image information from 3-dimensional or 2-dimensional information to 1-dimensional information, and
the NN processes the data using a 3D convolution neural network.

20. The method of claim 19, wherein the AoI comprises a plurality of AoI, the plurality of AoI are located within a rain zone and the evaluating predicts the rain fade for the plurality of AoI.

* * * * *